United States Patent
Anton et al.

(10) Patent No.: US 6,936,326 B1
(45) Date of Patent: Aug. 30, 2005

(54) MICROPOROUS HEAT INSULATING BODY

(75) Inventors: Octavian Anton, Brüssel (BE); Ann Opsommer, Koningslo (BE)

(73) Assignee: Promat International N.V., Tisselt (BE)

( * ) Notice: Subject to any disclaimer, the term of this patent is extended or adjusted under 35 U.S.C. 154(b) by 0 days.

(21) Appl. No.: 09/857,181

(22) PCT Filed: Dec. 16, 1999

(86) PCT No.: PCT/EP99/10003

§ 371 (c)(1),
(2), (4) Date: Jun. 19, 2001

(87) PCT Pub. No.: WO00/37389

PCT Pub. Date: Jun. 29, 2000

(30) Foreign Application Priority Data

Dec. 19, 1998 (DE) .......................... 198 59 084

(51) Int. Cl.[7] .............................. B32B 3/02; B32B 1/04; B32B 9/04
(52) U.S. Cl. ............................. 428/68; 428/70; 428/76; 428/454
(58) Field of Search ..................................... 428/68, 70

(56) References Cited

U.S. PATENT DOCUMENTS

| 3,915,725 | A | | 10/1975 | Takahashi | |
| 4,359,496 | A | * | 11/1982 | Kratel et al. | 428/75 |
| 4,399,191 | A | * | 8/1983 | Iwabuchi et al. | 428/336 |
| 4,647,499 | A | * | 3/1987 | Takahashi et al. | 428/312.6 |
| 4,783,365 | A | * | 11/1988 | Sklarski et al. | 156/307.7 |
| 5,399,397 | A | | 3/1995 | Kollie et al. | |
| 5,556,689 | A | * | 9/1996 | Kratel et al. | 428/137 |
| 5,631,097 | A | * | 5/1997 | Andersen et al. | 428/703 |

FOREIGN PATENT DOCUMENTS

| DE | 41 06 727 A1 | 9/1992 |
| EP | 0 078 119 A1 | 5/1983 |
| EP | 0 829 346 A2 | 3/1998 |
| WO | WO 98/26928 | 6/1998 |

* cited by examiner

Primary Examiner—Harold Pyon
Assistant Examiner—Patricia L. Nordmeyer
(74) Attorney, Agent, or Firm—Jacobson Holman PLLC

(57) ABSTRACT

The microporous heat insulation body consists of a compressed heat insulation material containing from 30 to 90% by weight of a finely divided metal oxide, from 0 to 30% by weight of an opacifier, from 0 to 10% by weight of an inorganic fibrous material, and from 0 to 15% by weight of an inorganic binder, and additionally from 2 to 45% by weight, preferably from 5 to 15% by weight of xonotlite.

5 Claims, 2 Drawing Sheets

MICROPOROUS HEAT INSULATING BODY

The subject matter of the present invention is a microporous heat insulation body consisting of compressed heat insulation material containing from 30 to 90% by weight of a finely divided metal oxide, from 0 to 30% by weight of an opacifier, from 0 to 10% by weight of a fibrous material, and from 0 to 15% by weight of an inorganic binder.

Such a heat insulation body has been described, e.g., in EP-A-0 618 399, wherein, however, at least one surface of the formed piece is required to have channel pores having pore base areas of from 0.01 to 8 $mm^2$ and penetration depths of from 5 to 100%, based on the thickness of the formed piece, and wherein the surface of the formed piece contains from 0.004 to 10 channel pores per 1 $cm^2$.

Said heat insulation bodies are manufactured by a dry compression and a subsequent sintering at temperatures of from 500 to 900° C. with the channel pores being formed by drilling, punching, or milling and preferably by embossing punches. Due to these measures, it is possible to drain off the steam explosively escaping during the rapid heating such that a decomposition of the heat insulation body can be avoided.

The drawbacks of said heat insulation body are the complicated manufacturing process and the deterioration of the heat insulation properties due to the convection of gases within the pores.

Another process for the manufacturing of a microporous body has been described in EP-A-0 623 567, wherein oxides, hydroxides, and carbonates of the metals of the 2nd main group of the periodic system are compressed together with pyrogenically manufactured $SiO_2$ and optionally $Al_2O_3$ and an opacifier and an organic fiber with each other and then sintered at temperatures exceeding 700° C. This process is not only complicated but additionally suffers from the drawback that the re-cooling of this well isolating material takes a long time.

Heat insulation bodies prepared with highly heat-resistant adhesives and a slurry, a silica sol and a clay have been described in DE-C-40 20 771. Herein, also additional prior art regarding the manufacturing and composition of heat insulating bodies has been described. The drawback of all heat insulation bodies comprising organic components and in particular organic fibrous material is that said organic components burn at very high temperatures and feature an unwanted evolution of gas.

DE 41 06 727 describes heat insulation bodies having a plastic sheet cover, wherein special shrinkable plastic sheets are to be used. Also these heat insulation bodies still contain organic material and loose their dimensional stability if heated severely.

DE-C-42 02 569 describes moulds for pressing heat insulation bodies, in particular for electrical radiant heaters such as boiling plates.

EP-A-686 732 describes dry-compressed heat insulation plates consisting of different internal and external materials, said materials having stabilizing openings that throughout consist of the external material. Also these plates can be manufactured only in a complicated manner, and neither the mechanical stability nor heat insulating properties thereof are optimal.

Said heat insulation plates have another drawback in that it is difficult to avoid damaging the outer layers during cutting and processing steps unless very expensive tools such as laser cutters are used since said cutters are capable of vitrifying the freshly formed cut edges.

Another attempt to solve the problems in the manufacture of heat insulation plates for obtaining optimal properties has been described in EP 0 829 346, where the difficulties and drawbacks of the state of the art have been listed once again.

An important problem in the manufacture of heat insulation bodies by a dry compressing of the components is that these material tend to resile and to re-expand after compressing such that at least high pressures have to be employed in order to achieve results of some use.

Although the bending strength of said heat insulation plates may be improved by adding fibrous material, higher fibre amounts tend to enhance the delamination and to deteriorate the coherence of the compressed mixture during the critical demolding step.

In any case, the heat insulation plates should not contain organic or combustible components which might result in the evolution of partially also toxic gases during a heating to high temperatures. Finally, it should be possible to process the finished heat insulation bodies easily and without any problems, e.g., it should be possible to saw, cut, or drill said bodies without any problems with no unwanted dust being formed.

Finally, the heat insulation bodies are required to be good electrical insulators in many cases. However, there exist uses where it is desired that at least one of the surfaces has an electrical conductivity to be able to dissipate electrostatic charges.

Now, all these problems have been solved by microporous heat insulation bodies consisting of a compressed heat insulation material containing from 30 to 90% by weight of finely divided metal oxide, from 0 to 30% by weight of an opacifier, from 0 to 10% by weight of an inorganic fibrous material, and from 0 to 15% by weight of an inorganic binder, wherein the body additionally contains from 2 to 45% by weight, preferably from 5 to 15% by weight of xonotlite.

Figure 1:
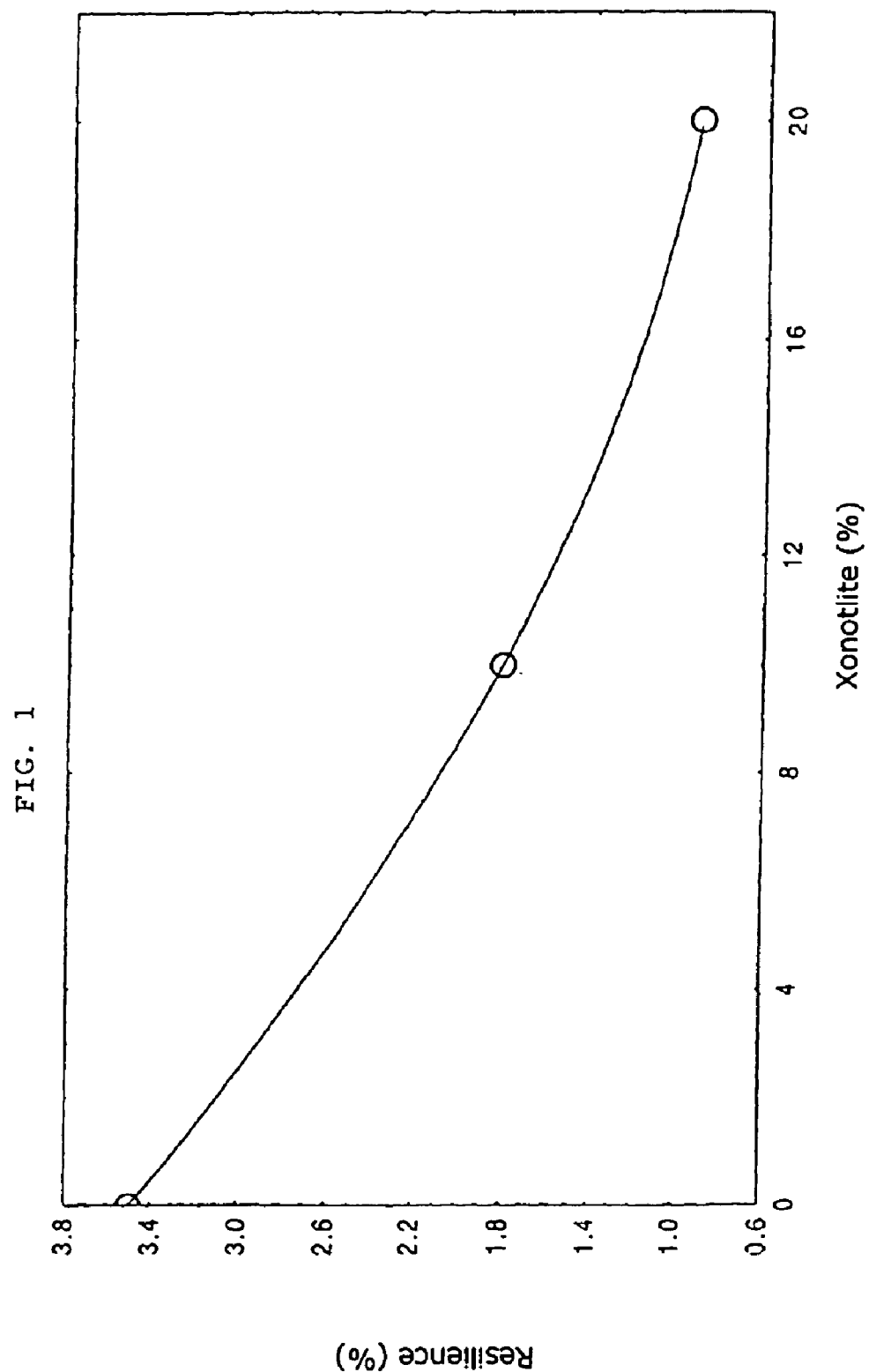
FIG. 1 is a graphic representation of data obtained in accordance with Example 2.

Preferably, said microporous heat insulation body has a cover of a heat-resistant material on one or both surfaces thereof. Especially preferred are covers which are the same or different and consist of rough-pressed xonotlite, mica or graphite. With the use of xonotlite and/or mica covers being good electrical insulators are formed. With the use of graphite there is formed a cover which has a conductivity enabling at least the dissipation of electrical charges. Thus, in certain uses it may be advantageous to form one side of the cover from xonotlite and/or mica and the other cover from graphite.

The heat insulation bodies are manufactured by dry-compressing, wherein the mechanical compacting is improved by the addition of xonotlite without a sintering at higher temperatures being necessary. Furthermore, the addition of xonotlite results in a lower resilience after compressing. Furthermore, the addition of relatively low amounts of fibrous material considerably improves the bending strength of the finished heat insulation bodies if xonotlite is a component thereof.

Finally, the use of xonotlite in the core results in an improvement of the homogeneity of the dry mix both during the preparation and in the final product.

The residual components of the heat insulation body of the invention can be selected from the materials already known for this purpose. As finely divided metal oxides, e.g., pyrogenically prepared silicic acids including are silicic acid, precipitated low-alkali silicic acids, silicon dioxide aerogels, analogously prepared aluminium oxides and mixtures thereof are used. Pyrogenically prepared silicic acids are especially preferred.

As opacifiers, titanium dioxide, ilmenite, silicon carbide, iron(II) iron(III) mixed oxides, chromium dioxide, zirconium oxide, manganese dioxide, iron oxide, silicon dioxide, aluminium oxide, and zirconium silicate, and mixtures thereof can be used. Above all, said opacifiers are used to absorb and scatter infrared radiation and thus provide a good insulation against heat radiation of the higher temperature range.

As fibrous materials, glass fibres, mineral wool, basalt fibres, cinder wool, ceramic fibres and whiskers, and fibre ropes prepared from, e.g., melts of aluminium and/or silicon oxides and mixtures thereof are suitable.

If desired, additional inorganic binders such as water glass, aluminium phosphates, borides of aluminium, titanium, zirconium, calcium; silicides such as calcium silicide and calcium aluminium silicide, boron carbide and basic oxides such as magnesium oxide, calcium oxide, and barium oxide may be used.

Generally, such binders are not necessary if xonotlite is used. Some of these binders may also be used as a dry premix with xonotlite since they can be homogeneously incorporated in this state particularly easily.

As xonotlite, synthetically manufactured xonotlite is used since natural xonotlite is not available in sufficient quantities and at acceptable costs. The preparation of synthetic xonotlite has been described, e.g., in GB-1193172 and EP 0 231 460.

Said synthetically prepared xonotlite is generally obtained in the form of beads consisting of felted needles. However, according to the invention also non-felted or hardly felted needles obtained during the preparation, use, and processing of xonotlite for other purposes, which may be mixed with other components of such products, may also be employed.

If covering one or both surfaces of the heat insulation bodies of the invention with a heat-resistant material is desired, commercial mica and graphite sheets may be used. Further, it is possible to make a layer material from pre-compressed xonotlite which is introduced into the bottom and the top of the mold for the residual dry mix and compressed together with said dry mix.

The properties of the microporous heat insulation bodies of the invention may vary depending on the desired purposes of application. The physical properties of the final product can also be adjusted to the respective purpose by adapting the composition of the heat insulation bodies.

The invention will be illustrated in more detail in the following examples and comparative examples.

Example 1

A mixture of 68% by weight of pyrogenic silicic acid, 30% by weight of rutile serving as an opacifier, and 2% by weight of silicate fibres (6 mm in length) were intensively dry-mixed in a compulsory mixer and then dry-compressed in a rectangular metal mould under a pressing pressure of 0.9 MPa, whereby a plate having a density of 320 kg/m$^2$ was obtained. After releasing the pressing pressure and demolding the plate, the thickness of a 15 mm thick plate increased by 3 to 4% due to resilience and re-expansion. The mechanical stability of the heat insulation body is only low.

Example 2

Various amounts of a synthetic xonotlite (Promaxon®, a commercial product of the Promat company, Belgium) are added to the mixture of example 1 and said mixtures are compressed according to example 1. The resilience and re-expansion distinctly decrease with increasing amounts of xonotlite. The data are summarized below and illustrated in FIG. 1:

| Xonotlite (%) | Resilience (%) |
| --- | --- |
| 0 | 3.5 |
| 10 | 1.8 |
| 20 | 0.9 |

Figure 2:
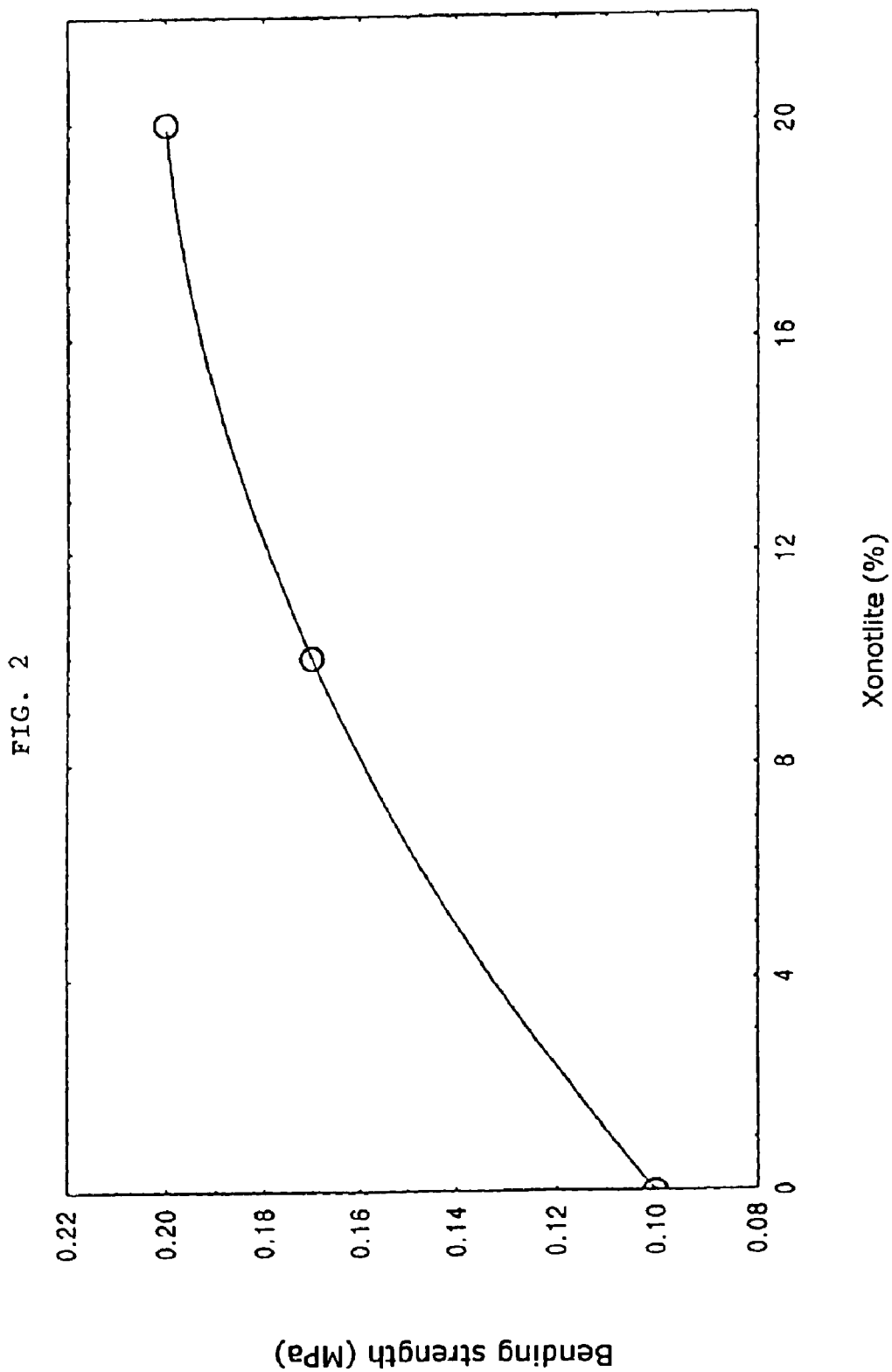
FIG. 2 is a graphic representation of data obtained with Example 2.

According to the data summarized in following table and illustrated FIG. 2, the addition of xonotlite results in an increase of the bending strength.

| Xonotlite (%) | Bending strength (MPa) |
| --- | --- |
| 0 | 0.10 |
| 10 | 0.17 |
| 20 | 0.20 |

From these data and FIG. 2 it can be derived that an addition of xonotlite of up to 20% by weight also increases the bending strength.

What is claimed is:

1. A microporous heat insulation body comprising a compressed heat insulation material containing from 30 to 90% by weight of a finely divided metal oxide, from 0 to 30% by weight of an opacifier, from 0 to 10% by weight of an inorganic fibrous material, and from 0 to 15% by weight of an inorganic binder, characterized in that the body additionally contains from 2 to 45% by weight of xonotlite, the heat insulation body being non-cracked as manufactured by dry-compressing.

2. The microporous heat insulation body according to claim 1, characterized in that xonotlite is present in an amount of 5 to 15% by weight.

3. The microporous heat insulation body according to claim 1, characterized in that one or both surfaces have a cover of a heat-resistant material.

4. The microporous heat insulation body according to claim 3, characterized in that the covers are the same or different and consist of pre-compressed xonotlite, mica, or graphite.

5. The microporous heat insulation body according to claim 3, characterized in that the cover consists of a pre-fabricated mica sheet on both surfaces.

* * * * *